No. 686,175. Patented Nov. 5, 1901.
F. J. WILKE.
VALVE AND VALVE GEAR FOR ENGINES.
(Application filed Apr. 1, 1901.)
(No Model.) 5 Sheets—Sheet 3.
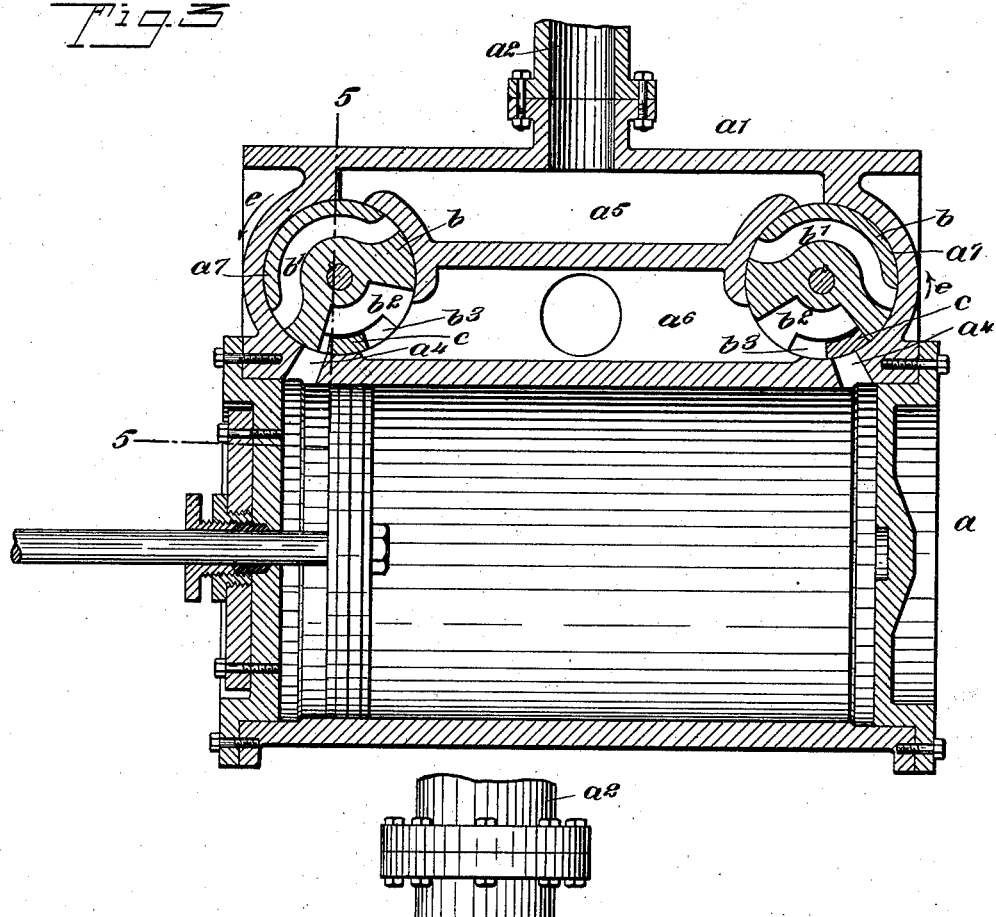
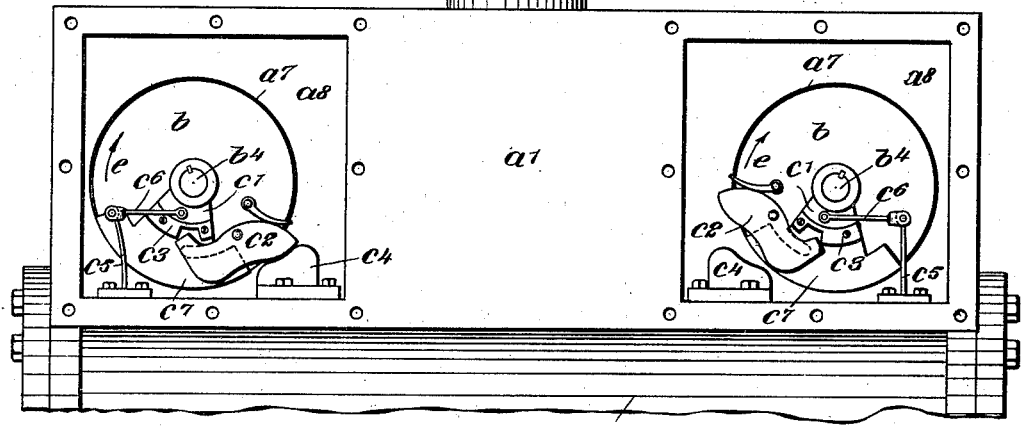
WITNESSES: INVENTOR
Frank J. Wilke
BY
ATTORNEYS No. 686,175. Patented Nov. 5, 1901.
F. J. WILKE.
VALVE AND VALVE GEAR FOR ENGINES.
(Application filed Apr. 1, 1901.)
(No Model.) 5 Sheets—Sheet 4.

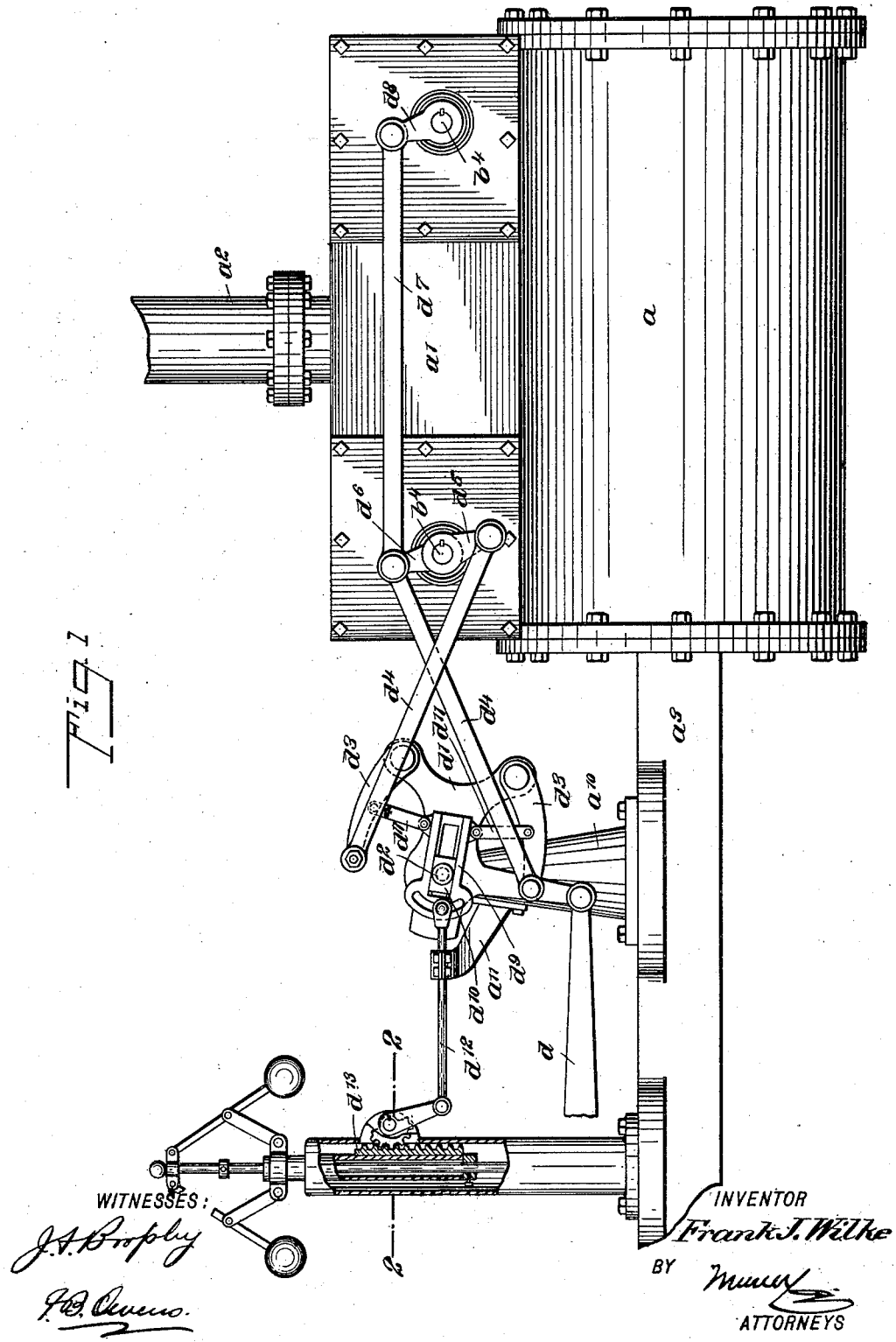

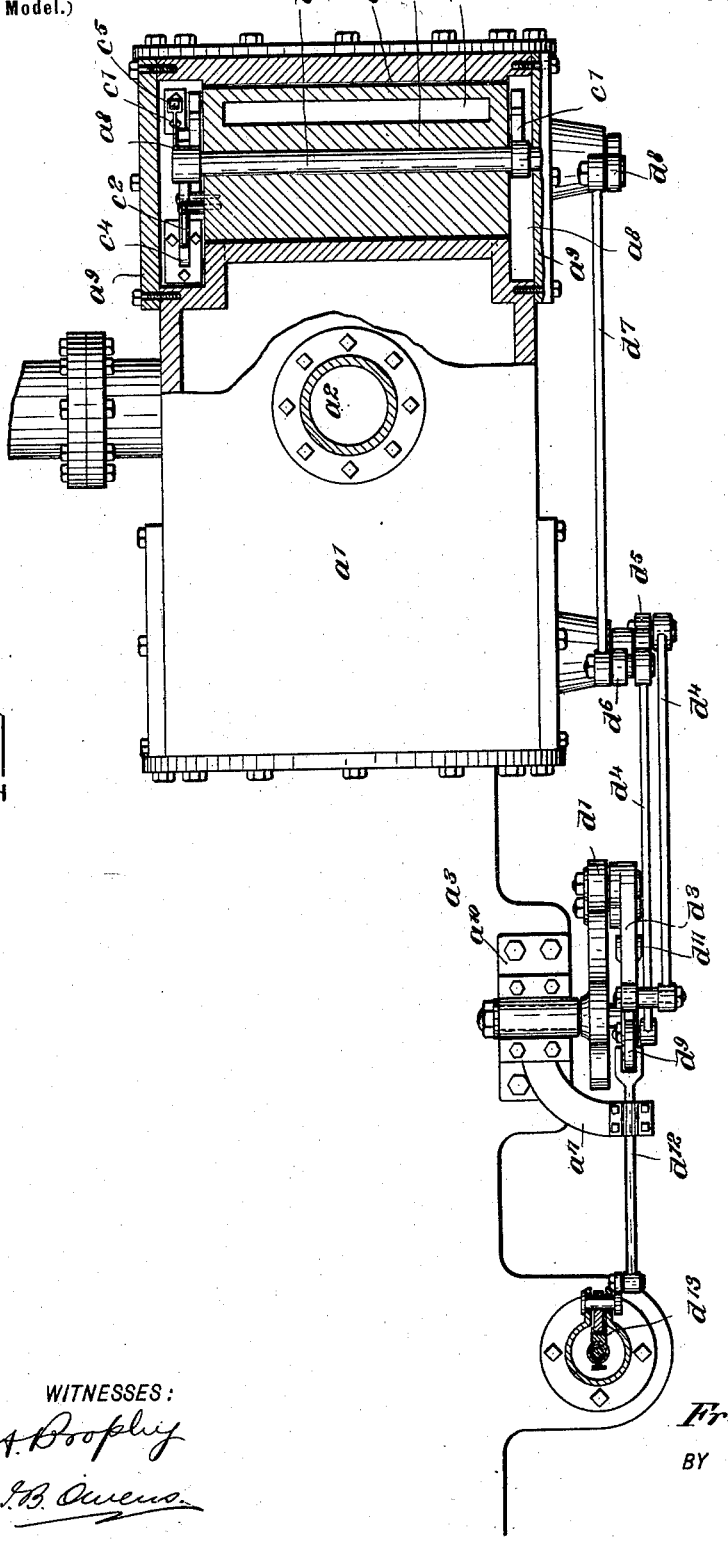

WITNESSES:
J. A. Brophy
J. B. Owens.

INVENTOR
Frank J. Wilke
BY
ATTORNEYS

No. 686,175. Patented Nov. 5, 1901.
F. J. WILKE.
VALVE AND VALVE GEAR FOR ENGINES.
(Application filed Apr. 1, 1901.)
(No Model.) 5 Sheets—Sheet 5.
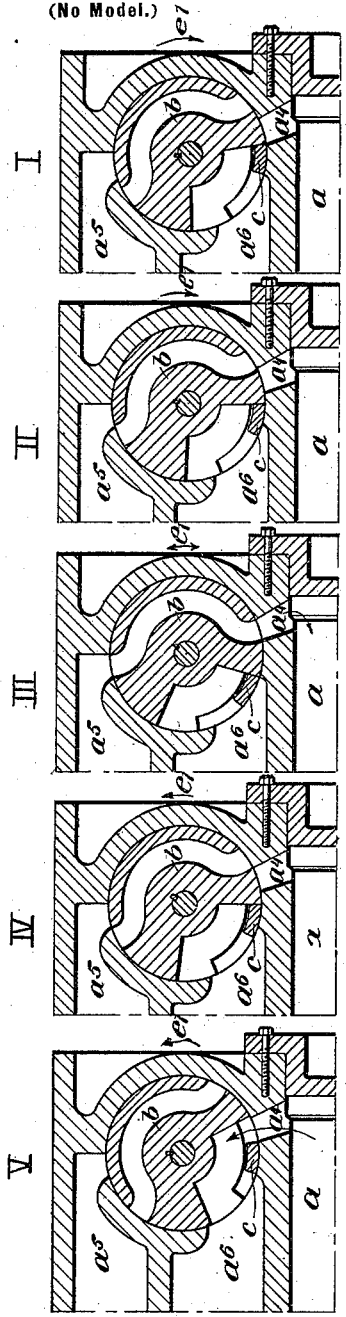
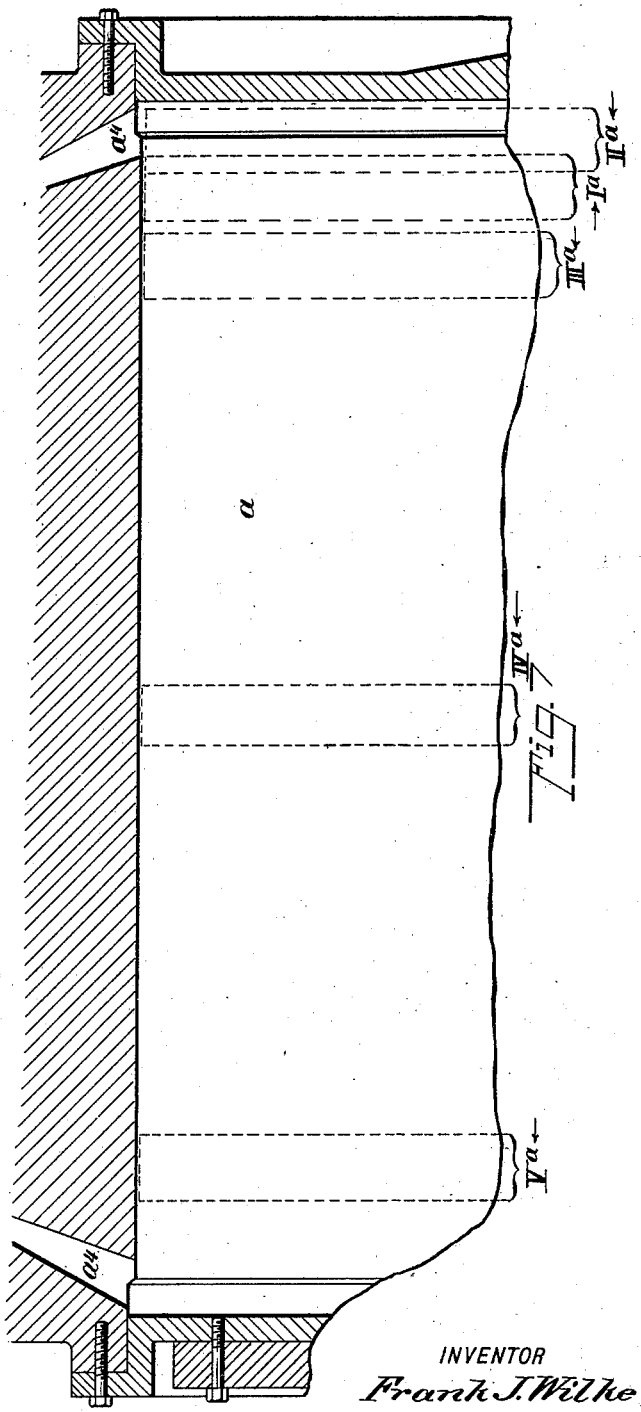
WITNESSES:
INVENTOR
Frank J. Wilke
BY
ATTORNEYS

UNITED STATES PATENT OFFICE.

FRANK J. WILKE, OF LITTLE ROCK, ARKANSAS.

VALVE AND VALVE-GEAR FOR ENGINES.

SPECIFICATION forming part of Letters Patent No. 686,175, dated November 5, 1901.

Application filed April 1, 1901. Serial No. 53,837. (No model.)

*To all whom it may concern:*

Be it known that I, FRANK J. WILKE, a citizen of the United States, and a resident of Little Rock, in the county of Pulaski and State of Arkansas, have invented a new and Improved Valve and Valve-Gear, of which the following is a full, clear, and exact description.

This invention relates to the form and operating-gear of the valves for reciprocating steam-engines. I employ a rocking valve, with which a release or fly-back valve works, to cover and uncover the exhaust. The valve is driven from a rocker provided with an adjustable part controlled by the governor and to which the valve-rod is connected, so as properly to control the steam.

This specification is a specific description of one form of my invention, while the claims are definitions of the actual scope thereof.

Reference is to be had to the accompanying drawings, forming a part of this specification, in which similar characters of reference indicate corresponding parts in all the views.

Figure 5:
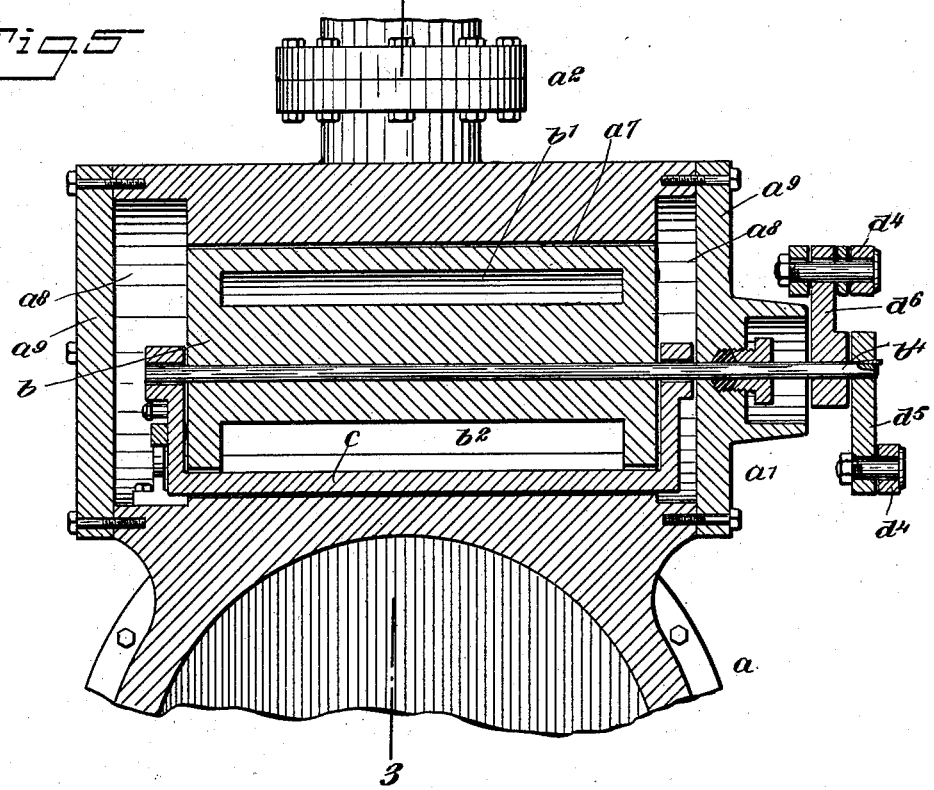
Figure 6:
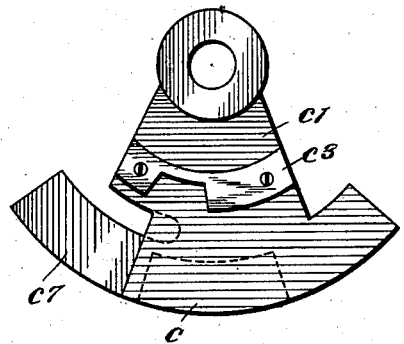

Figure 1 is a side view of the invention. Fig. 2 is a plan view thereof, partly in section, on the line 2 2 in Fig. 1. Fig. 3 is a section of the cylinder and valve-chest on the line 3 3 of Fig. 5. Fig. 4 is an elevation of the trip devices for the fly-back valves. Fig. 5 is a section on the line 5 5 of Fig. 3. Fig. 6 is an end view of one of the fly-back valves, and Fig. 7 is a diagrammatic section illustrating the action of the engine.

$a$ indicates the cylinder; $a'$, the valve-chest; $a^2$, the steam-pipe, and $a^3$ the engine-frame. $a^4$ indicates the steam-ports, and $a^5$ and $a^6$, respectively, the steam and exhaust chambers of the valve-chest.

$a^7$ indicates the valve-seats, which are disposed transversely of the cylinder and pass entirely through the chest $a'$, these seats terminating in enlargements $a^8$ and being covered by caps $a^9$, forming parts of the exterior walls of the valve-chest. The valve-seats communicate by suitable passages (see Fig. 3) with the steam-chamber $a^5$, the exhaust-chamber $a^6$, and the steam-ports $a^4$.

$b$ indicates the main valves, which are cylindrical in form and fitted to oscillate in the valve-seats $a^7$. Each valve has a feed-port $b'$, serving at proper periods of the operation to connect the chamber $a^5$ and the steam-ports $a^4$, and an exhaust-port $b^2$, serving in the same manner to connect the chamber $a^5$ with the steam-ports $a^4$.

$c$ indicates the fly-back valves, which lie in parallelism with the main valves and occupy cavities $b^3$ in the end walls of said valves, the fly-back valves extending through the exhaust-ports $b^2$ of the valves $b$ and the cavities $b^2$ therein being sufficient in size to allow the valves $c$ that independent movement essential to the operations to be hereinafter explained. The valves have inwardly-extending arms $c'$ at their ends, mounted loosely on the stems $b^4$ of the valves $b$ and lying, respectively, at the ends of said valves $b$ within the cavities $a^8$ at the ends of the valve-seats $a^7$. (See Fig. 5.) The main valves are keyed on the stems. (See Fig. 3.)

On one end of each valve $b$ and lying within one cavity $a^8$ of each valve-seat is pivoted a latch $c^2$, spring-pressed, so as normally to engage with a notched plate $c^3$, carried on the adjacent arm $c'$ of the coacting valve $c$. These latches are disengaged from the plates $c^3$ as the valves turn by trips $c^4$, arranged in the paths of the latches, and held stationary with the walls of the valve-chest and located within the same valve-seat enlargements $a^8$ as contain the latches $c^2$. When the latches $c^2$ release the valves $c$, they are thrown to open position (see V, Fig. 7) by spring-arms $c^5$, connected with the arms $c'$ of the valves $c$ by links $c^6$ and arranged at the same end of the valve as the parts $c^2$ and $c^4$. Each end of the valves $c$ is provided with a ring $c^7$, and these rings lie on the outer ends of the valves $b$ to cover the before-mentioned cavities $b^3$ of said valves. The latches $c^2$ being normally engaged with the valves $c$, such valves rock with the main valves until the latches are disengaged, which occurs when they strike the trips $c^4$. (See left-hand end of Fig. 4.) When this takes place, the spring-arms $c^5$ assert themselves and the valves $c$ are thrown independently of the main valves to uncover the exhaust.

The valves are driven by the connecting-rod $d$ from the eccentric. (Not shown.) This rod $d$ is connected with a rocker $d'$, carried fast on a shaft $d^2$, supported in a pedestal $a^{10}$ from the engine-frame. Carried pivotally on the rocker $d'$ are two arms $d^3$, located at opposite sides of the axis of the rocker and having rods $d^4$ respectively pivoted thereto. The rods $d^4$ are crossed (see Fig. 1) and are connected, respectively, with cranks $d^5$ and $d^6$ on the stem $b^4$ of the adjacent valve. Of the cranks $d^5$ and $d^6$ the former is fast to the valve-stem to impart a rocking movement thereto, and the latter is a loose crank, to which is connected a rod $d^7$, extending to the other valve and connected therewith through the medium of a crank $d^8$ on the stem of said other valve. The movements of the valves are regulated in accordance with the proper speed of the engine by a slide $d^9$, mounted on a guide $d^{10}$, carried fast on the shaft $d^2$ and rocking in time with the rocker $d'$. This slide $d^9$ is connected by links $d^{11}$ to the arms $d^3$, and by movement of the slide the throw of the arms $d^3$ may be controlled, thus regulating the movement of the parts $d^4$, $d^5$, $d^6$, $d^7$, and $d^8$, and consequently of the valves. The slide $d^9$ is moved by a rod $d^{12}$, actuated from the governor $d^{13}$ and having engagement with the walls of a slot formed in the slide and curved around the center of movement thereof. The rod $d^{12}$ is held to slide, but prevented from other movement by an arm $a^{11}$ on the pedestal $a^{10}$.

Having described above the preferred construction and arrangement of the parts of my invention, I will now proceed to trace the action of the valves.

The valves are rocked by the gear provided therefor and the action of the governor on the slide $d^9$ controls the admission of steam. Referring to Fig. 3, it will be seen that the left-hand valve is turning in the direction of the arrow $e$ to close the exhaust. During this movement the release or fly-back valve $c$ is stationary, the latch $c^2$ having been disengaged therefrom. (See right-hand side of Fig. 4.) As the valve $b$ moves (left hand, Fig. 3, and right hand, Fig. 4) it closes the adjacent port $a^4$ and at the same time the latch $c^2$ enters the notched plate $c^3$ and then the valve $c$ moves on with the valve $b$. As the valves rock back the latch $c^2$ engages the trip $c^4$ and the spring-arm $c^5$ throws the valve $c$ independently of the valve $b$, thus uncovering the exhaust. Fig. 3 (right hand) and Fig. 4 (left hand) show the parts during or immediately before the operation. The movements are indicated by the several arrows $e$ in the views referred to. Fig. 7 shows diagrammatically the positions of the valve in reference to the piston positions. Positions I and I$^a$ show the exhaust closed or the point of compression, the piston nearing the end of its stroke; positions II and II$^a$ show the valve the instant before the steam is admitted and the piston at the end of its stroke; positions III and III$^a$ show the valve open to admit the steam and the piston started on its return stroke; positions IV and IV$^a$ show the cut-off, and positions V and V$^a$ show the exhaust. The movements are indicated by the arrows $e'$. The valve $c$ moves with the valve $b$ until it reaches a point somewhat beyond position IV, thus covering the exhaust and prolonging the period of compression. Then the latch $c^2$ is released and the valve $c$ flies back away from the steam-port $a^4$ and the steam is exhausted.

Having thus described my invention, I claim as new and desire to secure by Letters Patent—

1. The combination of a main valve, with exhaust and feed passages therein, and a release or fly-back valve arranged at the exhaust-passage of the main valve and movable independently to cover and uncover the exhaust.

2. The combination of a main valve with exhaust and feed passages therein, a release or fly-back valve arranged at the exhaust-passage for the purpose specified, and movable independently of the main valve, a releasable device for holding the two valves to move together, and a means for independently moving the release-valve upon the disengagement of said device for holding the valves together.

3. The combination of an oscillating main valve, a release or fly-back valve capable of independent movement thereon, a latch carried by the main valve and engaging the release-valve, a trip mounted in the path of the latch to release the same, and a spring pressing the release-valve.

4. The combination of a rocker, a governor-controlled slide arranged to rock therewith, an arm mounted on the rocker and movable independent thereof, and a connection between said arm and the slide.

5. The combination of a rocker, a governor-controlled slide arranged to rock therewith, an arm pivoted on the rocker, and a link extending between the free part of the arm and the slide.

6. The combination of a valve, a rod connected therewith, a rocker, an arm mounted thereon and connected with the rod, said arm being movable independently of the rocker, a governor-controlled slide moving with the rocker, and a connection between the said arm and the slide.

7. The combination of a valve, comprising a main part and a fly-back part independently movable on the main part, a releasable device for holding the two parts to move together, a trip for said releasable part, a valve-rod, a rocker, a governor-controlled slide moving with the rocker, an arm mounted on the rocker and connected with the valve-rod, said arm being movable independently of the rocker, and a connection between the slide and arm.

8. The combination with an engine-cylinder, of a main valve commanding the feed and exhaust, and a relief or fly-back valve working in time with the main valve and serving temporarily to cover the exhaust.

9. The combination with an engine-cylinder, of a valve commanding the feed and exhaust, a relief or fly-back valve working in time with the main valve and serving temporarily to cover the exhaust, a rocker, a governor-controlled slide arranged to rock therewith, an arm pivoted on the rocker, a link extending between the free part of the arm and the slide, and a connection between the arm and the valve.

10. The combination with an engine-cylinder, of a valve, a rocker, a governor-controlled slide arranged to rock therewith, an arm mounted on the rocker and movable independently thereof, a connection between the arm and the valve, and a connection between the arm and the slide.

In testimony whereof I have signed my name to this specification in the presence of two subscribing witnesses.

FRANK J. WILKE.

Witnesses:
HOWARD ADAMS,
R. D. PLUNKETT.